United States Patent
Viaud et al.

(10) Patent No.: US 6,453,805 B1
(45) Date of Patent: Sep. 24, 2002

(54) ARRANGEMENT FOR SECURING LOOSE TWINE ENDS ON A CYLINDRICAL BALE

(75) Inventors: Jean Viaud, Gray; Jean Francois Fournier, Chargey les Gray; Jerome Repellin, Autrans; Aurelien Chabassier, Dampmart, all of (FR)

(73) Assignee: Deere & Company, Moline, IL (US)

( * ) Notice: Subject to any disclaimer, the term of this patent is extended or adjusted under 35 U.S.C. 154(b) by 122 days.

(21) Appl. No.: 09/605,016

(22) Filed: Jun. 28, 2000

(30) Foreign Application Priority Data

Jul. 2, 1999 (DE) .......................... 199 30 674

(51) Int. Cl.[7] .............................................. B65B 13/04
(52) U.S. Cl. .............................. 100/31; 100/5; 100/13; 100/88; 53/116; 53/136.3; 53/389.3
(58) Field of Search .................. 100/5, 13, 88; 56/341; 53/116–118, 136.3, 389.3, 389.4, 389.5

(56) References Cited

U.S. PATENT DOCUMENTS

| | | | | | |
|---|---|---|---|---|---|
| 5,129,207 A | * | 7/1992 | Butler | ................ | 53/118 |
| 5,289,672 A | * | 3/1994 | Underhill | ................ | 53/389.3 |
| 5,419,253 A | * | 5/1995 | Campbell | ................ | 100/3 |
| 6,050,052 A | * | 4/2000 | Herron et al. | ................ | 53/118 |

FOREIGN PATENT DOCUMENTS

| | | |
|---|---|---|
| DE | A1-27 05 101 | 8/1978 |
| DE | A-41 32 664 | 4/1993 |
| EP | A1-0 820 69 | 1/1998 |

* cited by examiner

*Primary Examiner*—John Sipos
*Assistant Examiner*—Hemant M. Desai

(57) ABSTRACT

A large round baler has an expansible baling chamber defined, in part, by a plurality of side-by-side mounted belts that act to roll up crop to form a bale within the chamber. The baler is equipped with a twine wrapping arrangement which leaves loose twine ends adjacent one of the ends of the wrapped baler. In order to secure these loose ends, there is provided an adhesive tape dispensing arrangement, which cooperates with the bale-forming belt that is aligned with the area of the bale on which the loose twine ends lie, so that a length of adhesive tape is selectively fed into the bale chamber by the bale-forming belt such that it is wrapped about the bale in covering relationship to the loose twine ends. A separating arrangement is provided for causing that part of the length of adhesive tape that is wrapped about the bale to be separated from the supply roll of tape.

8 Claims, 3 Drawing Sheets

ARRANGEMENT FOR SECURING LOOSE TWINE ENDS ON A CYLINDRICAL BALE

The invention concerns an arrangement for securing a loose twine end on a cylindrical bale by means of a self-adhering tape.

BACKGROUND OF THE INVENTION

DE-A-41 32 664 discloses a large round baler with a twine wrapping arrangement and an arrangement for securing a twine end lying on a circumferential surface of the cylindrical bale. The twine end is secured according to an embodiment by using a tape that may be configured as adhesive and that is conducted by means of two supply rolls and a guide vane to an inlet slot for the harvested crop. There the tape is grasped by the rotating bale and wrapped around it.

EP-A1-0 820 691 discloses a large round baler equipped with a net wrapping arrangement wherein a net guide surface of the arrangement is brought into contact with a rotating member or members of the bale-forming chamber so that the rotating member or members carries the net material into the baling chamber for being wrapped about the bale. The problem of loose twine ends is not applicable to a net wrapping operation.

DE-A1-27 05 101 discloses an arrangement that makes it possible to simultaneously wrap twine and bands of plastic sheet material about a cylindrical bale, where the twine may be located underneath as well as on top of the plastic sheet material. This sheet material, that can also be supplied in one layer over the entire width of the bale, is not capable and is not intended to secure the loose twine ends, but is used to cover the outer surface of the bale so as to protect it from the weather. Plastic sheet bands and loose yarn ends could unwrap together from the bale.

The problem underlying the invention is seen in the fact that, in the prior art, the tape supply rolls must be driven independently which results in an increased cost.

SUMMARY OF THE INVENTION

According to the present invention, there is provided an arrangement for securing twine ends on the circumference of a cylindrical bale, with the tape being conducted to the bale by an arrangement which represents an Improvement over that disclosed in DE-A-41 32 664.

An object of the invention is to provide an arrangement for applying adhesive tape to loose twine ends of twine wrapped about the bale by making use of a conveying element that is already present

DESCRIPTION OF THE PREFERRED EMBODIMENT

Figure 1:
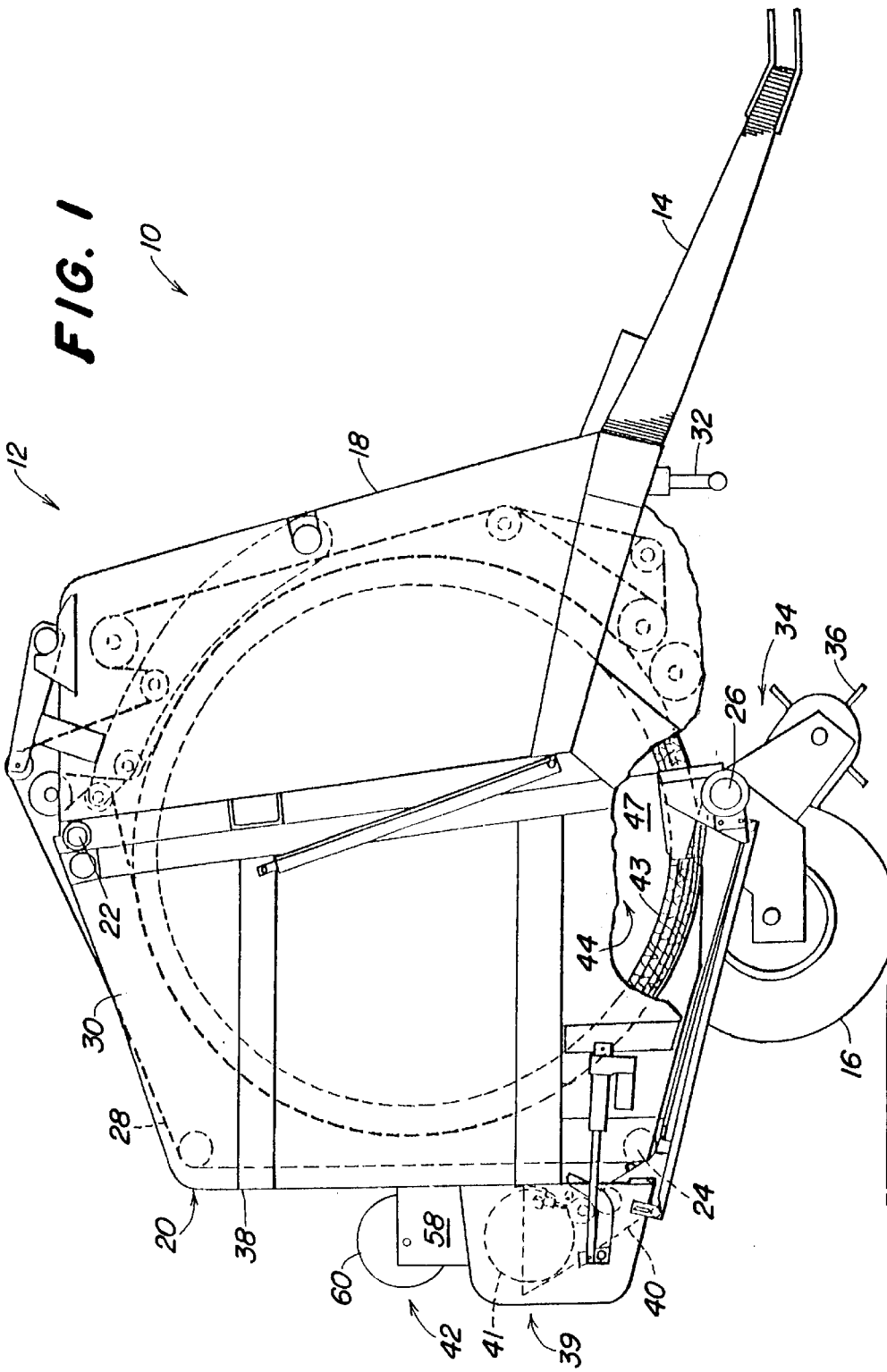
FIG. 1 is a right side elevational view of a large round baler of the type with which the present invention is particularly adapted for use.

FIG. 1 shows a large round baler 10 with a housing 12 supported on wheels 16 and that can be coupled to an agricultural tractor, not shown, by a towbar 14. The housing 12 is composed of a rigid, front housing section 18 and a rear housing section 20 that is pivotally attached to an upper rear location of the housing section 18 so that the rear section forms a discharge gate which may be elevated to permit a completed bale to be discharged onto the ground. The housing 12 contains a multitude of rolls of which lower rear and front rolls 24 and 26, respectively, of the rear housing section 20 are shown. Several endless conveying elements 28 extend over the rolls and are arranged alongside each other, the elements largely surrounding a region between opposite side walls 30 of the housing 12 so as to cooperate with the latter to form a baling chamber 44. In this embodiment, the conveying elements 28 are configured as belts. In the lower region of the baling chamber 44, an inlet 34 is provided, that is bordered to the rear by the roll 26 and that admits crop taken up by a pick-up 36 into the baling chamber 44. On a rear wall 38 of the rear housing section 20, a net wrapping arrangement 39 is provided. The net wrapping arrangement 39 includes opposite support walls 40 fixed to the rear housing section rear wall 38 and supporting a net material supply roll 41, with a length of net material 43 here being shown introduced into the baling chamber 44 and wrapped around, and over the ends of, a cylindrical bale 47 formed in the baling chamber 44. The wrapped length of net material 43 is shown in a condition just before it is severed from the supply roll 41, after which the end portion extending between the bale and severing device will be wrapped upon the bale, with the wrapped net then serving to prevent the bale 47 from falling apart after being discharged from the baling chamber 44.

Underneath the towbar 14, there is shown a portion of a twine wrapping arrangement 32 for wrapping a formed bale with twine in lieu of net so as to bind the bale together. In this embodiment, the arrangement 12 is configured in such a way that the last twine windings are deposited on the left side of the cylindrical bale, as viewed from behind facing in the direction of forward travel. The round baler 10, as described so far, is already known in the state of the art and hence does not require any further description.

Figure 2:
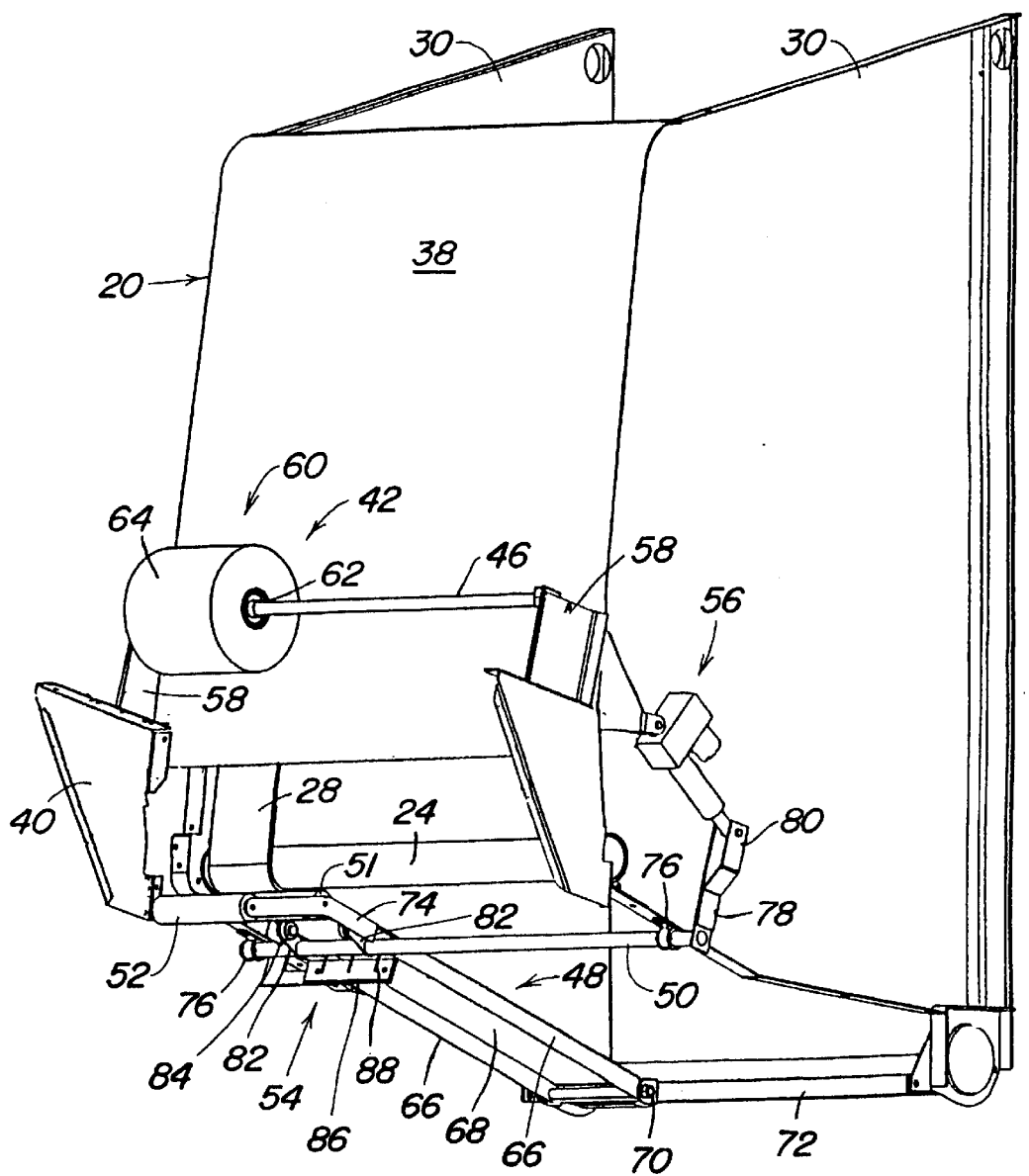
FIG. 2 is a right rear perspective view, showing the rear region of the round baler with an arrangement for securing a loose twine end on a cylindrical bale.

Referring now to FIG. 2, there is shown mounted to the rear of the rear housing section 20 an arrangement 42 for securing loose twine ends on the surface of cylindrical bales formed in the baling chamber 44 by using; adhesive tape, it being noted that all but the support walls 40 of the net wrapping mechanism 39 has been removed. Among other items, the arrangement 42 includes a tape supply roll carrier 46, a fastening material guide structure 48, a positioning shaft 50, front and rear fastening material feed rolls 51 and 52, respectively, and an adhesive tape separating or severing device 54.

While the arrangement 42 is shown in connection with a large round baler having an expansible baling chamber, it is to be understood that, as a deviation from this, the arrangement 42 can also be provided on a large round baler having a fixed baling chamber and can be placed at a location other than the rear of the baling chamber. Further, it is to be understood that the invention could be applied to balers having, in place of bale forming belts, chains or rolls.

Figure 3:
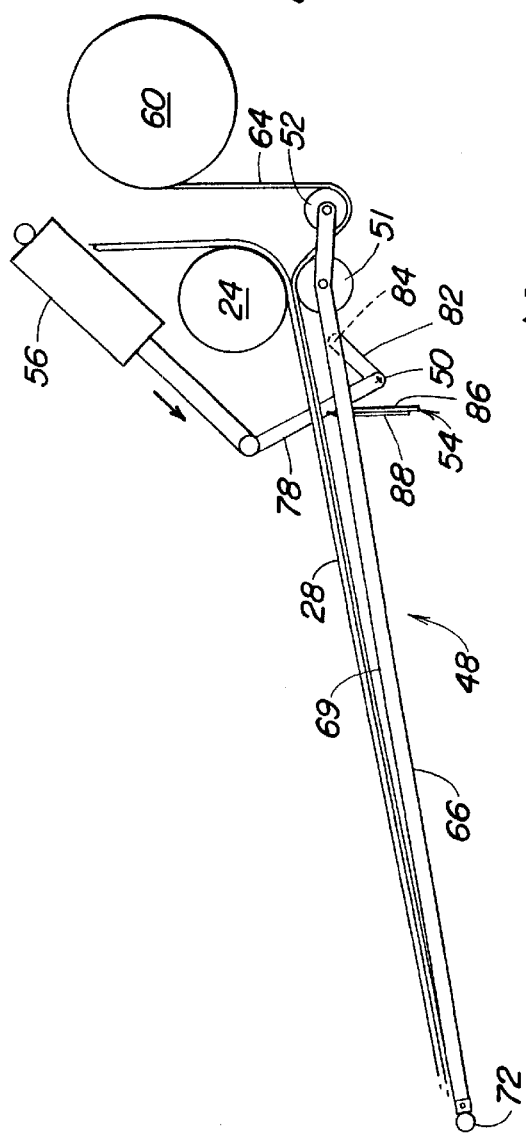
FIG. 3 shows a schematic view of the arrangement according to FIG. 2, with the arrangement being shown in an operating position.
Figure 4:
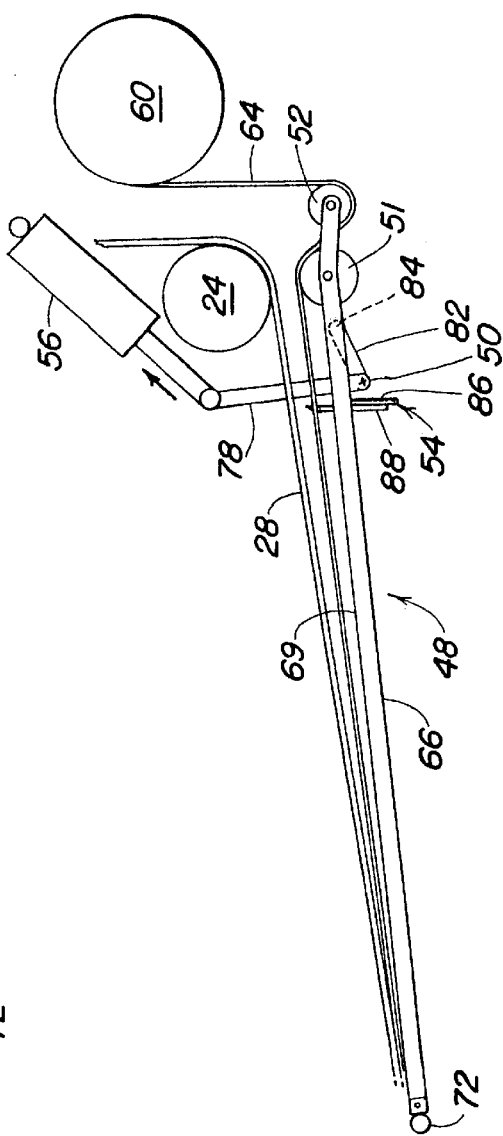
FIG. 4 is view like that of FIG. 3, but showing the arrangement in a non-operating position.

The roll carrier 46 is configured as a rigid axle and is retained in support walls 58 that are fixed on the rear wall 38. Received on the roll carrier 46 is an adhesive tape supply roll 60, where a brake 62, for example in the form of a cone mounted on the roll carrier and spring-loaded against an end of a core of the roll 60. The brake 62 operates, on the one hand, to prevent the roll 60 from rotating freely on the roll carrier 46 and, on the other hand, to fix the location of the roll 60 on the roll carrier 46 in the sideways direction. If desired, a second brake 62 could be mounted on the roll carrier so as to bear against the opposite end of the core of the roll 60. In the embodiment shown, the roll carrier 46 is located above the net wrapping arrangement 40. As a deviation from this, the roll 60 could be supported in bearings on an axle that could be present for a net roll. Furthermore, the roll carrier 46 extends over the entire width of the baling chamber 44, so that a length of tape 64 (FIGS. 3 and 4) may be supplied at every location along the length of a cylindrical bale formed in the baling chamber 44. However, fundamentally, it is sufficient if the roll 60 is supported in bearings located so that the roll 60 is aligned fore-and-aft either with the side or the center of the formed cylindrical bale. The roll 60 contains a large amount of thin, elastic, durable and adhering tape 64. The fixing can be attained: by a bonding agent applied to one or both sides of the tape 64 or by adhesion.

The guide structure 48 is configured as an inverted U, whose legs 66 extend downward and contain a bottom 68 between them. The side of the bottom 68 facing the conveying element 28 defines a guide surface 69 which is very smooth so that it offers very low frictional resistance. The frictional resistance can be further reduced by the application of another material to the bottom 68, for example, PTFE, that is, Teflon, so as to define the surface 69. The guide structure 48 extends generally from under the lower front discharge gate roll 26 to the rear wall 38 so that it also passes beneath the lower rear discharge gate roll 24. The forward region of the guide structure 48 is supported by a bearing 70 so as to pivot vertically on a transverse support 72 of the rear housing section 20. In its rear end region, the guide structure 48 extends above and beyond the positioning shaft 50 and is provided at its ends with two arms 74 in which the pair of rolls 51 and 52 are supported, free to rotate. The position of the guide structure 48 is selected in such a way that the guide surface 69 it is in vertical alignment with the leftmost conveying element 28 and is in fore-and-aft alignment with the tape supply roll 60. In the region of the separating arrangement 54, the bottom 68 of the guide structure 48 is provided with openings, not shown.

In this case, the positioning shaft 50 extends underneath the rear housing section 20 and over its entire width. To support it and permit it to pivot freely, bearings 76 are provided at the underside of the side walls 30. On the right side, as seen in the direction of operation, a lower end of a lever arm 78 is fixed the an end of the positioning shaft 50, with an upper end of the lever arm 78 being provided with a fork 80. In the region of the guide structure 48 and between the legs 66, two arms 82 are attached, preferably welded, radially to the positioning shaft 50. At their free ends, the arms 82 carry rolls 84, that are in contact with the underside of the bottom 68.

Free rotation of the pair of rolls 51 and 52 is accomplished by first and second pairs of bearings respectively located at fore-and-aft spaced positions, that are relatively close to each other, in the arms 74. The positions are selected in such a way that the front roll 51 can be brought into contact with the lower rear baler belt-support roll 24, while the rear roll 52 is used to alter the direction of the tape 64. One or both of the rolls 51 and 52, if desired, can be configured as a spreader roll that extends the tape 64 in its width as it runs over the rolls. The fastening of the pair of rolls 51 and 52 by means of the arms 74 guarantees that the rolls move in unison with the guide structure 48.

The separating arrangement 54 is provided with a transverse rail 86 that extends underneath and cross ways to the length of the guide structure 48. Several pointed pins 88 that extend vertically are attached to the rail 86, which can extend through the aforementioned openings in the bottom 68 of the guide structure 48. The length of the pins 88 is selected in such a way that they extend through the openings and end above the tape 64 when the guide structure 48 is located in a lower, pause or non-operating position, while they extend into the interior of the U-shape when the guide structure 48 is moved towards the conveying element 28. In place of the generally needle-shaped pins 88, serrations, teeth or the like could be provided with which it is possible to perforate the tape 64 so that it tears when it is penetrated. In view of the tension applied by the cylindrical bale to the tape 64, the pins 88 must be able to absorb high bending moments when they penetrate the tape 64.

In place of a rigid separating arrangement 54, an adjustable one could be employed, and in place of the pins 88 a cutter could be used.

In the embodiment shown, the actuating arrangement 56 is configured as an electric motor that is supported in bearings at one end In the side wall 30 and at the other end in the fork 80, free to pivot. An electric motor has the, advantage that it can be controlled easily; nevertheless it would also be possible to use a hydraulic or a pneumatic motor. Beyond that, a purely mechanical operation could also be performed. The actuating arrangement 56 can be extended or retracted so as to act through the lever arm 78 and, thereby, pivot the positioning shaft 50. The control or regulation is performed through an arrangement, not shown, in which, for example, signals can be included concerning the wrapping process by means of the twine wrapping arrangement 32 and the position of the rear housing section 20.

The tape 64 is prepared, in the following manner, for being dispensed. The tape supply roll 60 is slid onto the roll carrier 46 and the roll carrier 46 is secured to the supports 58. Following this, the brake(s) 62 is (are) mounted onto the roll carrier 46 so as to properly locate the roll 60 and, by virtue of the spring-loaded cone(s), for example, prevent a free rotational movement of the roll 60. Following this, the tape 64 is pulled off the roll 60 and laid around the underside of the rear tape guide roll 52 and finally over the upper side of the front roll 51, so that an end of the tape 64 comes to lie in the gap between the guide surface 69, of the bottom 68, and the underside of the conveying element 28.

After all that, the system operates as follows, where initially the tape 64 is assumed to have been prepared for being dispensed in the manner described above.

After the twine wrapping process is completed by the twine wrapping arrangement 32, one or more loose twine ends lie on the left end region of the cylindrical bale, specifically in the area which is in fore-and-aft alignment with the tape 64. The aforementioned control arrangement receives a signal and extends the actuating arrangement 56 so that the latter acts through the lever 78 so as to rock the positioning shaft 50 and arms 82. Since the arms 82 or their rolls 84 are in contact with the underside of the bottom 68 of the guide structure 48, the guide structure is raised and the guide surface 69, and/or the front roller 51, is pressed, along with the tape 64 lying on it, against the underside of the moving conveying element 28. Due to the high frictional contact between the tape 64 and the conveying element 28, on the one hand, and the low friction on the guide structure 48, on the other hand, the tape 64 is carried along with the conveying element 28 to the baling chamber inlet 34 where it extends around the roll 26 and reaches the nip formed between the cylindrical bale and the conveying element 28. The cylindrical bale engages the tape 64 and, due to the rotation of the bale, wraps the tape about the circumference of the bale in the region of the previously wrapped loose twine ends. After more than one revolution, the second layer of the tape 64 is deposited upon the first layer and adheres on the basis of adhesion or the bonding agent, so that the loose twine ends are secured. As soon as a secure adhesion of the tape layers is assured, the guide structure 48 is again lowered whereby the pins 88 extend through the openings in the bottom wall 68, the tape 64 then being lowered onto the pins 88. As soon as the tape 64 is penetrated by the pins 88, the downstream part, which is under tension, tears off, while the part connected to the supply roll 60 is retained by the pins 88. Since the roll 60 does not overrun or barely does so by reason of the brake 62, it stops immediately.

What is claimed is:

1. In a large round baler having a baling chamber defined at least in part by a conveying element having a conveying surface movable along a path having a first location outside said baling chamber and a second location inside said baling chamber, said baler including a twine wrapping apparatus adapted for dispensing twine for being wrapped about a bale formed in the baling chamber of said baler and for arranging at least one loose twine end at a preselected circumferential location along a length of a bale formed in said baling chamber, and an adhesive tape wrapping apparatus adapted for dispensing adhesive tape for being wrapped about said bale in overlying securing relationship to said at least one loose twine end, the improvement comprising: said tape wrapping apparatus including a tape guide structure, including a guide surface, mounted adjacent said conveying element for movement between a standby position wherein said guide surface is spaced from said conveying element, and a dispensing position, wherein said guide surface is located at least closely adjacent said conveying element; a supply roll of adhesive tape located exteriorly of said baling chamber and adjacent said conveying element; a length of adhesive tape extending from said supply roll to said guide surface and being positioned between said conveying element and guide surface, whereby when said guide structure is in its dispensing position, the conveying element cooperates with said guide surface to pull additional tape from said supply roll and transport it into said baling chamber at said preselected circumferential location of said bale so as to overlie any loose twine ends located there; and a separating arrangement being mounted in the vicinity of said guide surface for engaging said length of adhesive tape and effecting separation of a portion wrapped about the bale from a portion remaining on said supply roll after a bale has been wrapped and the guide structure moved to its standby position.

2. The large round baler defined in claim 1 wherein said guide surface of said guide structure includes at least one guide roll located in the region of said conveying element and over which said length of adhesive tape extends and can be brought into contact with said conveying element when said guide structure is moved to its dispensing position.

3. The large round baler defined in claim 1 wherein said separating arrangement is a stationary unit; said guide structure being provided with at least one opening extending through said guide surface; said separating arrangement including a tape engaging portion located for extending through said guide surface opening and engaging said tape only when said guide structure is in its standby position.

4. The large round baler defined in claim 1 wherein said tape engaging portion of said separating arrangement includes a plurality of pins arranged in a line for selectively penetrating the length of adhesive tape when a bale has been wrapped, whereby, through continued rotation, the wrapped bale will tension said length of adhesive tape and cause it to separate along perforations caused by said pins.

5. The large round baler defined in claim 1 and further including a brake applied to said supply roll of adhesive tape to establish a drag which prevents the roll from free wheeling.

6. The large round baler defined in claim 1 and further including a powered actuating arrangement coupled for selectively moving said guide structure between said standby and dispensing positions.

7. The large round baler defined in claim 6 wherein said powered arrangement includes a rotatable shaft located on an opposite side of said guide surface from said conveying element; a cam fixed to said shaft and engaged with said guide structure, with said cam being shaped for moving said guide structure at least toward said dispensing position upon rotation of said shaft.

8. The large round baler defined in claim 1 wherein said guide surface is defined by a material having a low frictional resistance.

\* \* \* \* \*